US009595000B2

(12) United States Patent
Hong

(10) Patent No.: US 9,595,000 B2
(45) Date of Patent: Mar. 14, 2017

(54) NFC SMART SIGN

(71) Applicants: YEWON CO., LTD., Buan-gun, Jeollabuk-do (KR); Jong Hwan Hong, Buan-gun, Jeollabuk-do (KR); Eun Mi Ham, Buan-gun, Jeollabuk-do (KR)

(72) Inventor: Jong Hwan Hong, Jeollabuk-do (KR)

(73) Assignees: YEWON Co., Ltd., Buan-gun, Jeollabukdo (KR); Jong Hwan Hong, Buan-gun, Jeollabukdo (KR); Eun Mi Ham, Buan-gun, Jeollabukdo (KR)

( * ) Notice: Subject to any disclaimer, the term of this patent is extended or adjusted under 35 U.S.C. 154(b) by 0 days.

(21) Appl. No.: 14/962,752

(22) Filed: Dec. 8, 2015

(65) Prior Publication Data
US 2016/0300132 A1    Oct. 13, 2016

(30) Foreign Application Priority Data
Apr. 9, 2015   (KR) .................. 20-2015-0002258 U

(51) Int. Cl.
  *G06F 17/00* (2006.01)
  *G06K 19/077* (2006.01)
  *H04B 5/00* (2006.01)
(52) U.S. Cl.
  CPC ..... *G06K 19/07749* (2013.01); *H04B 5/0025* (2013.01); *H04B 5/0056* (2013.01)
(58) Field of Classification Search
  CPC ..... H04W 4/008; H04W 12/04; H04W 12/06; H04W 4/02; H01Q 7/00; H01Q 1/2225; H01Q 1/526; H02J 7/025; E05B 73/0017; G06K 19/07749; H04B 5/0037

USPC .................................................. 235/492, 375
See application file for complete search history.

(56) References Cited

U.S. PATENT DOCUMENTS

| 4,957,256 | A * | 9/1990 | Boeding | G09F 1/10 248/225.11 |
| 8,646,697 | B1 * | 2/2014 | DePrisco | G06K 19/005 235/487 |
| 8,905,317 | B1 * | 12/2014 | Hsu | G06K 7/10356 235/487 |
| 2007/0261280 | A1 * | 11/2007 | Rastegar | G08B 13/1436 40/541 |
| 2009/0128331 | A1 * | 5/2009 | Lopez | E05B 73/0017 340/572.1 |
| 2011/0253790 | A1 * | 10/2011 | Day | E05B 73/0017 235/487 |
| 2013/0141567 | A1 * | 6/2013 | Walker | H04M 1/7253 348/135 |
| 2014/0340929 | A1 * | 11/2014 | Nakamura | G02B 6/0045 362/601 |
| 2015/0189505 | A1 * | 7/2015 | Marien | H04L 63/0838 380/270 |
| 2015/0208778 | A1 * | 7/2015 | Velentzas | A45C 11/182 150/149 |

(Continued)

FOREIGN PATENT DOCUMENTS

KR     10-1309378 B1    10/2013

*Primary Examiner* — Thien M Le
(74) *Attorney, Agent, or Firm* — Novick, Kim & Lee, PLLC; Jae Youn Kim

(57) ABSTRACT

The present invention relates to an NFC smart sign that can prevent damage to an NFC tag and allows an NFC tag to be easily replaced when the information in the NFC tag is required to be changed or supplemented.

2 Claims, 6 Drawing Sheets

(56) References Cited

U.S. PATENT DOCUMENTS

2015/0372719 A1* 12/2015 Greene ................ H04W 4/008
　　　　　　　　　　　　　　　　　　　455/41.1

* cited by examiner

NFC SMART SIGN

BACKGROUND OF THE INVENTION

Field of the Invention

The present invention relates to an NFC smart sign that can prevent damage to an NFC tag and allow an NFC tag to be easily replaced when the information in the NFC tag is required to be changed and supplemented.

Description of the Related Art

In general, there are various signs for providing useful information to users in various facilities such as an amusement park, an arboretum, a museum, and a public place. For example, a user may need information about rides in an amusement park, information about exhibits in a museum, and information such as the names, scientific names, species, and lifespans of trees in an arboretum, so those facilities provide the information simply on signs.

In relation to this subject, for example, as shown in FIG. 1 in Korean Patent No. 10-1309378, generally, the information about a tree is shown on a display side 10a of a sign and the sign is placed in front of or beside the tree.

However, according to the way of showing the information about a tree disclosed in Korean Patent No. 10-1309378, simple letters or images are provided on the display side 10a, so the amount of the information is limited and sufficient information cannot be provided for users. Further, users have to get close to the sign to read the information.

Furthermore, it is required to replace the entire display side 10a in order to change the contents on the sign, so it is troublesome and expensive.

The information disclosed in the Background of the Invention section is only for the enhancement of understanding of the background of the invention, and should not be taken as an acknowledgment or as any form of suggestion that this information forms a prior art that would already be known to a person skilled in the art.

SUMMARY OF THE INVENTION

Accordingly, the present invention has been made keeping in mind the above problems occurring in the related art, and the present invention is intended to allow a user to be actively provided with sufficient information kept in an NFC tag by recognizing an NFC tag in a hole of a wood panel of a sign, using his/her portable terminal, and to keep checking information remaining in the portable terminal even if he/she moves away from the sign.

Further, the present invention is intended to propose an NFC smart sign that can prevent a damage to an NFC tag due to external factors such as rain and wind by shielding the NFC tag from exposure to the outside and that allows the NFC tag to be easily replaced when the information in the NFC tag needs to be changed or supplemented.

In order to achieve the above object, according to one aspect of the present invention, there is provided an NFC smart sign that includes: a wood panel having a display part on a front side and a seat on a rear side; an NFC tag received in the seat and keeping information relating to the display part; and a cover closing the seat with the NFC tag in the seat of the wood panel.

The NFC tag may be detachably attached to a bottom of the seat of the wood panel.

The cover may be formed to correspond to the shape of the seat, received in the seat, and fixed to the wood panel.

A ferrite sheet may be disposed on an inner side of the cover.

The cover may be received in the seat and fixed to the wood panel by bolts or permanent magnets.

A first side of the cover may be hinge-fixed to the rear side of the wood pane at a first side of the seat.

Grooves may be formed at a second side of the bottom of the seat and projections inserted in the grooves may be formed at a second side of the cover.

The thickness between the front side of the wood panel and the bottom of the seat may be 10 mm~20 mm.

According to the present invention, a user can be actively provided with sufficient information kept in an NFC tag by recognizing an NFC tag in a hole of a wooden panel of a sign, using his/her portable terminal, and can keep checking information remaining in the portable terminal even if he/she moves away from the sign.

Further, it is possible to prevent damage to an NFC tag due to external factors such as rain and wind by shielding the NFC tag from exposure to the outside and to allow the NFC tag to be easily replaced when the information in the NFC tag needs to be changed or supplemented.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinafter, exemplary embodiments of the present invention are described in detail with reference to the accompanying drawings. The scope of the present invention is not limited to the following embodiments and the present invention may be modified in various ways by those skilled in the art without departing from the spirit of the present invention.

Figure 1:
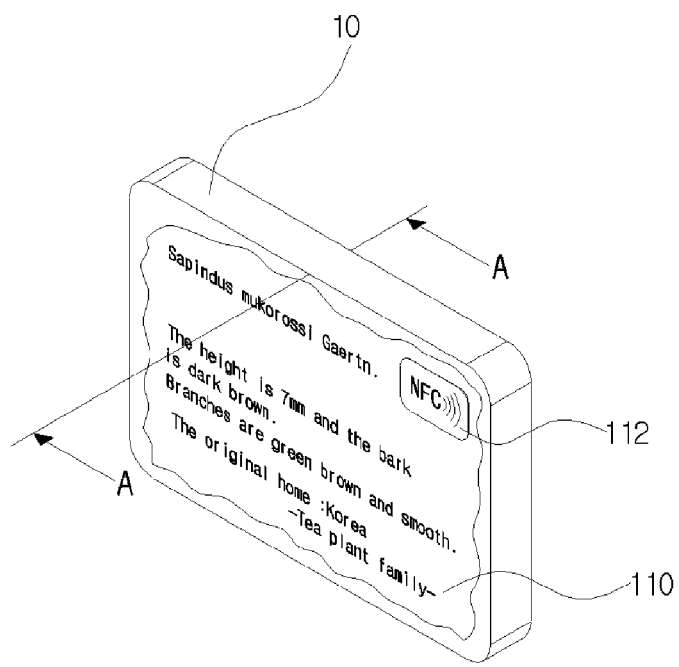
FIG. 1 is a perspective view schematically showing an NFC smart sign according to an embodiment of the present invention.
Figure 2:
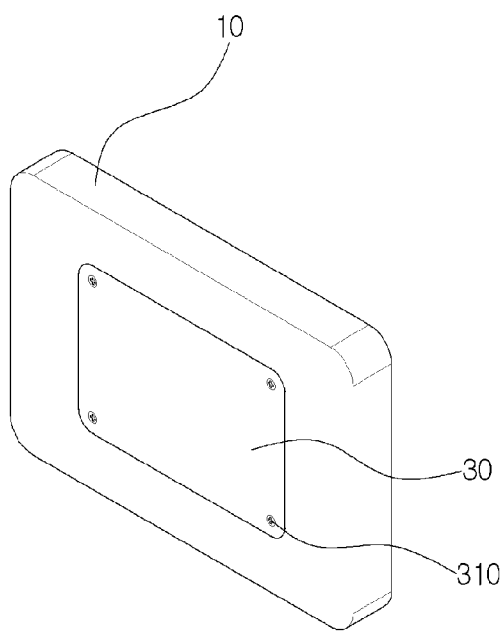
FIG. 2 is a perspective view showing the rear side of the NFC smart sign shown in FIG. 1.
Figure 3:
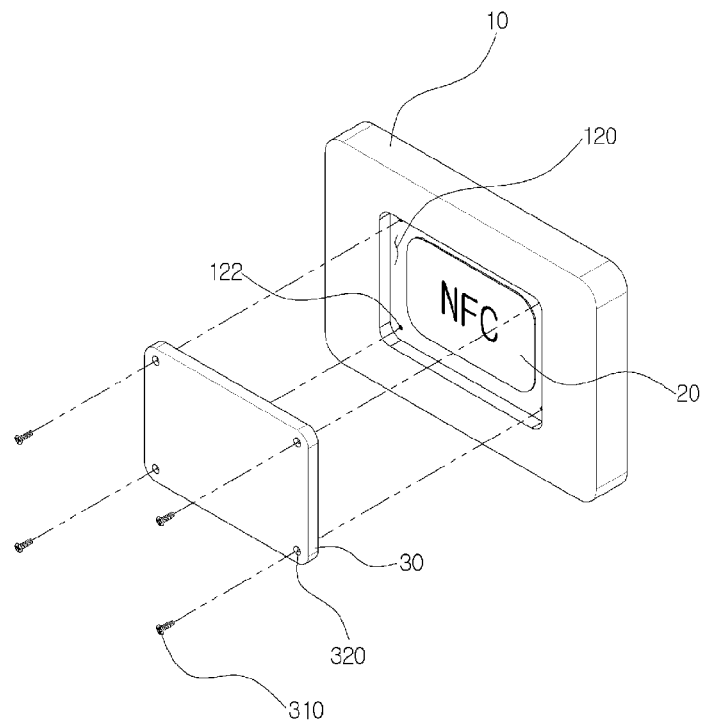
FIG. 3 is an exploded perspective view of the NFC smart sign shown in FIG. 2.

FIG. 1 is a perspective view schematically showing an NFC smart sign according to an embodiment of the present invention, FIG. 2 is a perspective view showing the rear side of the NFC smart sign shown in FIG. 1, and FIG. 3 is an exploded perspective view of the NFC smart sign shown in FIG. 2.

AN NFC smart sign according to an embodiment of the present invention is made of wood, can be used for various purposes, such as an information sign, a guide sign, and a directional sign, and includes a wood panel 10, an NFC tag 20, and a cover 30, as shown in FIGS. 1 to 3.

First, as shown in FIGS. 1 to 3, a display part 110 providing information about an object is provided on the front side of the wood panel 10 and a seat 120 where the NFC tag 20 is disposed is formed on the rear side of the wood panel 10.

The cover 30 for opening/closing the seat 120 is fastened to the rear side of the wood panel 10.

An NFC indicator 112 that shows that the NFC tag 20 is in the wood pane 10 may be disposed on the front side of the display 110.

As shown in FIG. 3, the NFC tag 20 having information such as identification, explanation, and an URL of an object that is described on the display part 110 is disposed in the seat 120 on the rear side of the wood panel 10.

The NFC tag 20 can be detachably attached to the bottom of the seat 120 by tape or Velcro having an adhesive layer on the rear side.

In detail, when a user tags the NFC guide 112 on the front side of the display part 110 with a portable terminal, the portable terminal can recognize the identification, explanation, and URL of the object stored in the NFC tag 20 in the seat 120 of the wood panel 10.

Accordingly, the user can actively obtain sufficient information about the object, using the portable terminal, without getting close to the display part 110 and reading the contents provided on the sign.

The portable terminal may be a terminal having an exclusive application and a communication function, including a smartphone, a smart pad, and a PDA.

Figure 4:
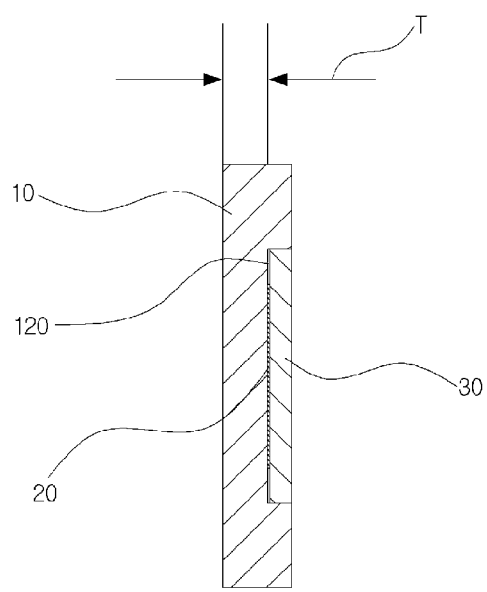
FIG. 4 is a cross-sectional view taken along line A-A of FIG. 1.

FIG. 4 is a cross-sectional view taken along line A-A of FIG. 1.

Further, as shown in FIGS. 2 to 4, the cover 30 may be formed in a shape corresponding to the seat 120 to open/close the seat 120 with the NFC tag 20 therein.

The cover 30 can be fixed to the wood panel 10 by bolts 310 or permanent magnets, with the inner side in contact with the bottom of the seat 120 receiving the NFC tag 20.

In detail, as shown in FIG. 3, when the cover 30 is fixed to the wood panel 10 by the bolts 310, bolt holes 320 for fixing the bolts 310 are formed at upper, lower, left, and right sides of the cover 30. Threaded holes 122 in which the bolts 310 are inserted are formed at upper, lower, left, and right sides in the seat 120 to correspond to the bolt holes 320 of the cover 30.

Further, though not shown in the figures, when the cover 30 is fixed to the wood panel 10 by permanent magnets, permanent magnets may be disposed at upper, lower, left, and right sides in the cover 30. Magnetic bodies such as a magnet or metal having a polarity opposite to the permanent magnets may be disposed at upper, lower, left, and right sides of the bottom of the seat 120 to correspond to the permanent magnets in the cover 30.

As described above, since the cover 30 is fixed to the wood panel 10 by the bolts 310 or permanent magnets, a manager can easily open/close the cover 30 to replace the NFC tag 20. Further, when it is required to change the information about the object described on the display part 110, it is possible to easily replace the NFC tag 20 in the seat 120 after opening the cover 30.

Further, as shown in FIGS. 3 and 4, since the seat 120 is closed by the cover 30 with the NFC tag 20 therein, the NFC tag 20 is not exposed outside the wood panel 10, so it is possible to prevent the NFC tag 20 from being damaged by external factors such as rain and wind.

In particular, in order to smoothly perform the communication function of the NFC tag 20 in the seat 120 and prevent the wood panel 10 from being damaged, the thickness (T in FIG. 4) between the front side of the wood panel 10 and the bottom of the seat 120 may be 10 mm~20 mm.

When the thickness between the front side of the wood panel 10 and the bottom of the seat 120 exceeds 20 mm, the portion between the front side of the wood panel 10 and the bottom of the seat 120 is too thick, so a communication malfunction may be generated while the portable terminal of a user recognizes the NFC tag 20, and an interrogation rate may decrease, so smooth communication cannot be made.

When the thickness between the front side of the wood panel 10 and the bottom of the seat 120 is less than 10 mm, the portion between the front side of the wood panel 10 and the bottom of the seat 120 is too thin, so the wood panel 10 may be easily broken.

Figure 5:
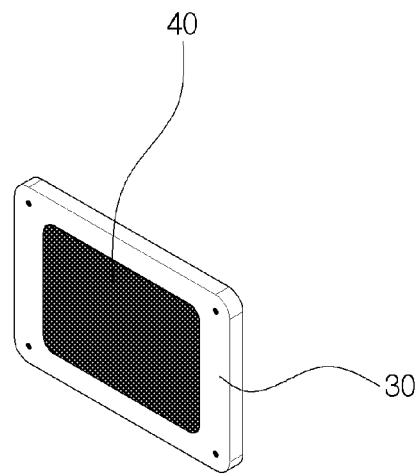
FIG. 5 is a perspective view schematically showing a ferrite sheet attached to the inner side of a cover.
Figure 6:
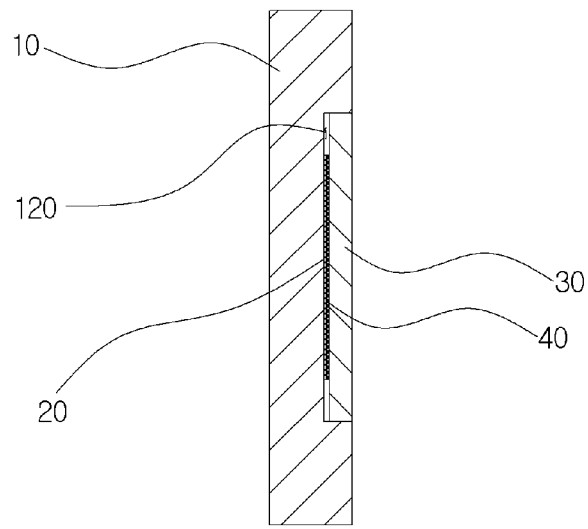
FIG. 6 is a cross-sectional view schematically showing a state when the cover with the ferrite sheet is fitted in a groove to which an NFC tag is attached.

FIG. 5 is a perspective view schematically showing a ferrite sheet attached to the inner side of a cover and FIG. 6 is a cross-sectional view schematically showing a state when the cover with the ferrite sheet is fitted in a groove to which an NFC tag is attached.

Since the NFC technology is for local communication, when there is an obstacle, it means the available communication range decreases.

In order to remove this problem, as shown in FIGS. 5 and 6, a ferrite sheet 40 may be attached to the inner side of the cover 30.

By the ferrite sheet 40, it is possible to increase the available communication range by maintaining electron bonding between the NFC tag 20 and the portable terminal of a user, so it is possible to increase reliability and stability of NFC.

As shown in FIG. 6, when the cover 30 with the ferrite sheet 40 is fixed to the seat 120, the NFC tag 20 on the bottom of the seat 120 and the ferrite sheet 40 can be bonded and fixed. Accordingly, the ferrite sheet 40 supplements the communication range of the NFC tag 20, so NFC can be amplified.

In particular, when it is required to replace the NFC tag 20 in order to correct or supplement the information in the NFC tag 20, it is possible to replace only the NFC tag 20 without replacing both of the NFC tag 20 and the ferrite sheet, so replacement is easy and the replacement cost is reduced.

Figure 7:
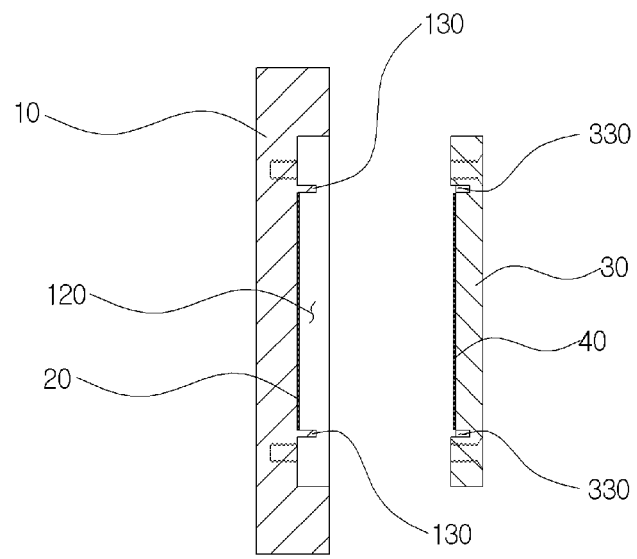
FIG. 7 is a cross-sectional view schematically showing projections in the groove on a wood panel and grooves on the inner side of the cover.
Figure 8:
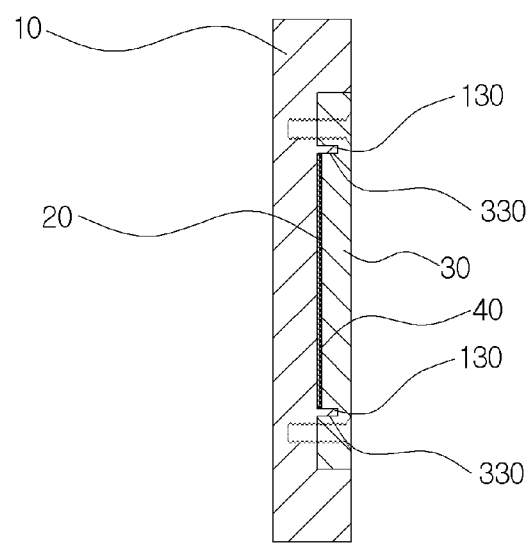
FIG. 8 is a cross-sectional view showing the assembly of the parts shown in FIG. 7.

FIG. 7 is a cross-sectional view schematically showing projections in the groove on a wood panel and grooves on the inner side of the cover and FIG. 8 is a cross-sectional view showing the assembly of the parts shown in FIG. 7.

Next, as shown in FIGS. 7 and 8, projections 130 may be formed on the bottom of the seat 120 and grooves 330 in which the projections 130 are inserted may be formed on the inner side of the cover 30.

In detail, as shown in FIG. 7, the projections 130 may protrude at a predetermined distance away from the seat 120 from the bottom of the seat 120 in a rectangular shape, with the NFC tag 20 on the bottom of the seat 120.

The grooves 330 may be formed at a predetermined depth in the inner side of the cover 30 in a shape corresponding to the shape made by the projections 130.

In particular, as shown in FIG. 8, the projections 130 in the seat 120 may be inserted in the grooves 330 of the cover 30.

Accordingly, it is possible to prevent water from flowing into the gap, which is formed when the cover 30 is fixed to the seat 120, so it is possible to prevent the NFC tag 20 and the ferrite sheet 40 from being damaged by water and the cover 30 can be more firmly fixed to the seat 120.

Figure 9:
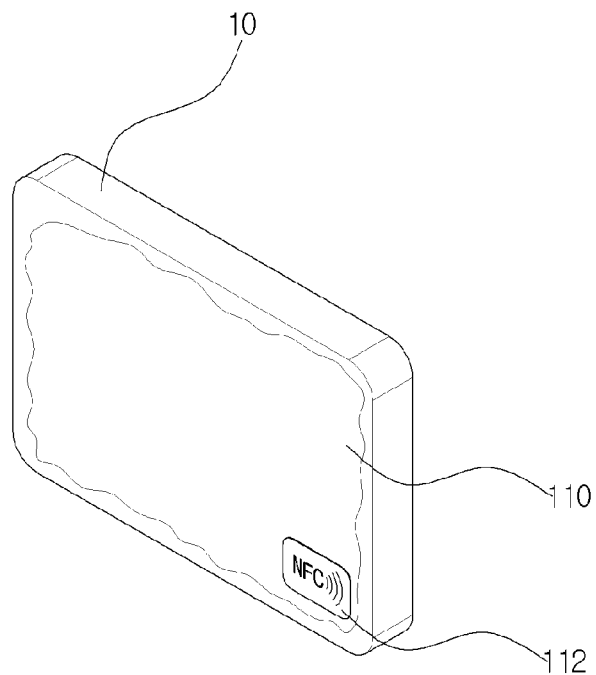
FIG. 9 is a perspective view schematically showing an NFC smart sign according to a second embodiment of the present invention.
Figure 10:
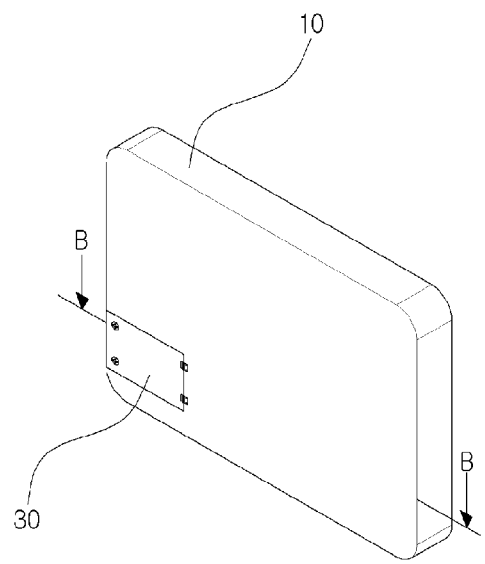
FIG. 10 is a cross-sectional view showing the rear side of the NFC smart sign shown in FIG. 9.

FIG. 9 is a perspective view schematically showing an NFC smart sign according to a second embodiment of the present invention and FIG. 10 is a cross-sectional view showing the rear side of the NFC smart sign shown in FIG. 9.

An NFC smart signal according to a second embodiment of the present invention is the same as that of the previous embodiment, but in which, as shown in FIG. 9, the NFC guide 112 is formed at a lower portion on the front side of the display part 110, and as shown in FIG. 10, the cover 30 is disposed at a side on the rear side of the wood panel 10.

Figure 11:
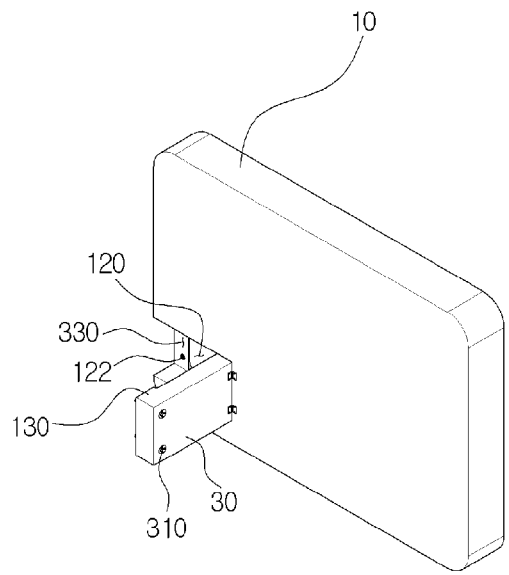
FIG. 11 is a perspective view schematically showing a cover that is open.
Figure 12:
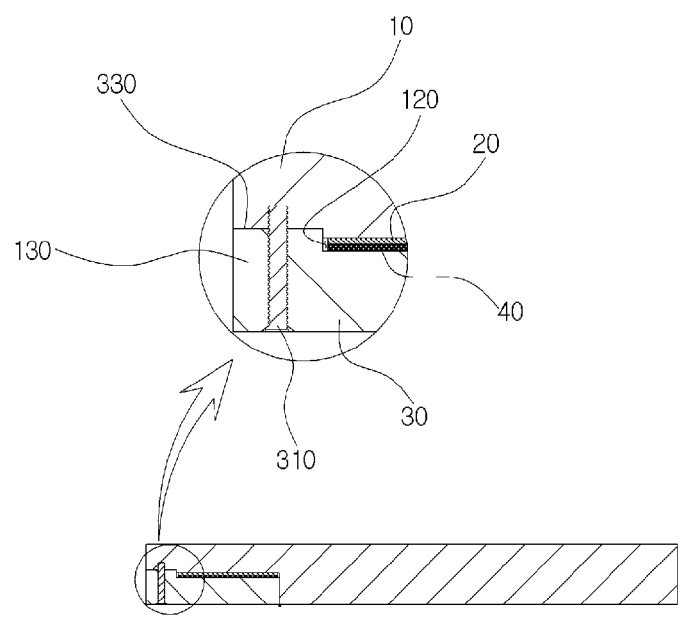
FIG. 12 is a cross-sectional view taken along line B-B of FIG. 10.

FIG. 11 is a perspective view schematically showing a cover that is open and FIG. 12 is a cross-sectional view taken along line B-B of FIG. 10.

As shown in FIGS. 10 to 12, a first side of the cover 30 may be hinge-fixed to the rear side of the wood panel 10 at a first side of the seat 120 and a second side of the cover 30 may be fixed to a side of the wood panel 10 by bolts.

A manager can open the cover 30 by holding the second side of the cover 30 and turning the cover 30 away from the wood panel 10.

In detail, as shown in FIG. 11, a plurality of bolt holes 310 for fixing bolts may be formed at the second side of the cover 30 and threaded holes 122 for receiving the bolts 310 may be formed at the side of the wood panel 10 to correspond to the bolt holes 310.

Further, as shown in FIGS. 11 and 12, grooves 330 may be formed at a second side of the seat 120 and projections 130 that protrude toward the grooves 330 and are inserted in the grooves 330 may be formed at the second side of the cover 30.

Although the exemplary embodiments of the present invention have been described for illustrative purposes, a person skilled in the art will appreciate that various modifications, additions and substitutions are possible, without departing from the scope and spirit of the present invention as disclosed in the accompanying claims.

What is claimed is:

1. An NFC smart sign comprising:
a wood panel having a display part on a front side and a seat on a rear side;
an NFC tag received in the seat and keeping information relating to the display part; and
a cover closing the seat with the NFC tag in the seat of the wood panel,
wherein the NFC tag is detachably attached to a bottom of the seat of the wood panel,
wherein the cover is formed to correspond to the shape of the seat, is received in the seat, and is fixed to the wood panel,
wherein a ferrite sheet is disposed on an inner side of the cover,
wherein the cover is received in the seat and fixed to the wood panel by permanent magnets,
wherein a thickness between the front side of the wood panel and the bottom of the seat is 10 mm~20 mm,
wherein the seat includes a plurality of projections protruding from the bottom of the seat for a predetermined length, and
wherein the cover includes a plurality of grooves with a predetermined depth disposed in the inner side of the cover and configured to engage with the plurality of projections.

2. An NFC smart sign comprising:
a wood panel having a display part on a front side and a seat on a rear side;
an NFC tag received in the seat and keeping information relating to the display part; and
a cover closing the seat with the NFC tag in the seat of the wood panel,
wherein the NFC tag is detachably attached to a bottom of the seat of the wood panel,
wherein the cover is formed to correspond to the shape of the seat, is received in the seat, and is fixed to the wood panel,
wherein a ferrite sheet is disposed on an inner side of the cover,
wherein a first side of the cover is hinge-fixed to the rear side of the wood pane at a first side of the seat,
wherein grooves are formed at a second side of the bottom of the seat and projections inserted in the grooves are formed at a second side of the cover,
wherein a thickness between the front side of the wood panel and the bottom of the seat is 10 mm~20 mm.

* * * * *